(No Model.)

V. M. ARMENTA.
DISTANCE MEASURING AND REGISTERING INSTRUMENT.

No. 467,847. Patented Jan. 26, 1892.

WITNESSES:
Dom Turtchell
C. Sedgwick

INVENTOR:
V. M. Armenta
BY Munn & Co.
ATTORNEYS

UNITED STATES PATENT OFFICE.

VICTOR ML. ARMENTA, OF SANTA MARTA, COLOMBIA.

DISTANCE MEASURING AND REGISTERING INSTRUMENT.

SPECIFICATION forming part of Letters Patent No. 467,847, dated January 26, 1892.

Application filed July 31, 1891. Serial No. 401,242. (No model.)

*To all whom it may concern:*

Be it known that I, VICTOR ML. ARMENTA, of Santa Marta, in the Republic of Colombia, have invented a new and Improved Distance Measuring and Registering Instrument, of which the following is a full, clear, and exact description.

The invention relates to surveying-instruments; and its object is to provide a new and improved distance measuring and indicating instrument which is simple and durable in construction, is readily moved over the ground to be measured, and arranged to avoid expansion and contraction.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
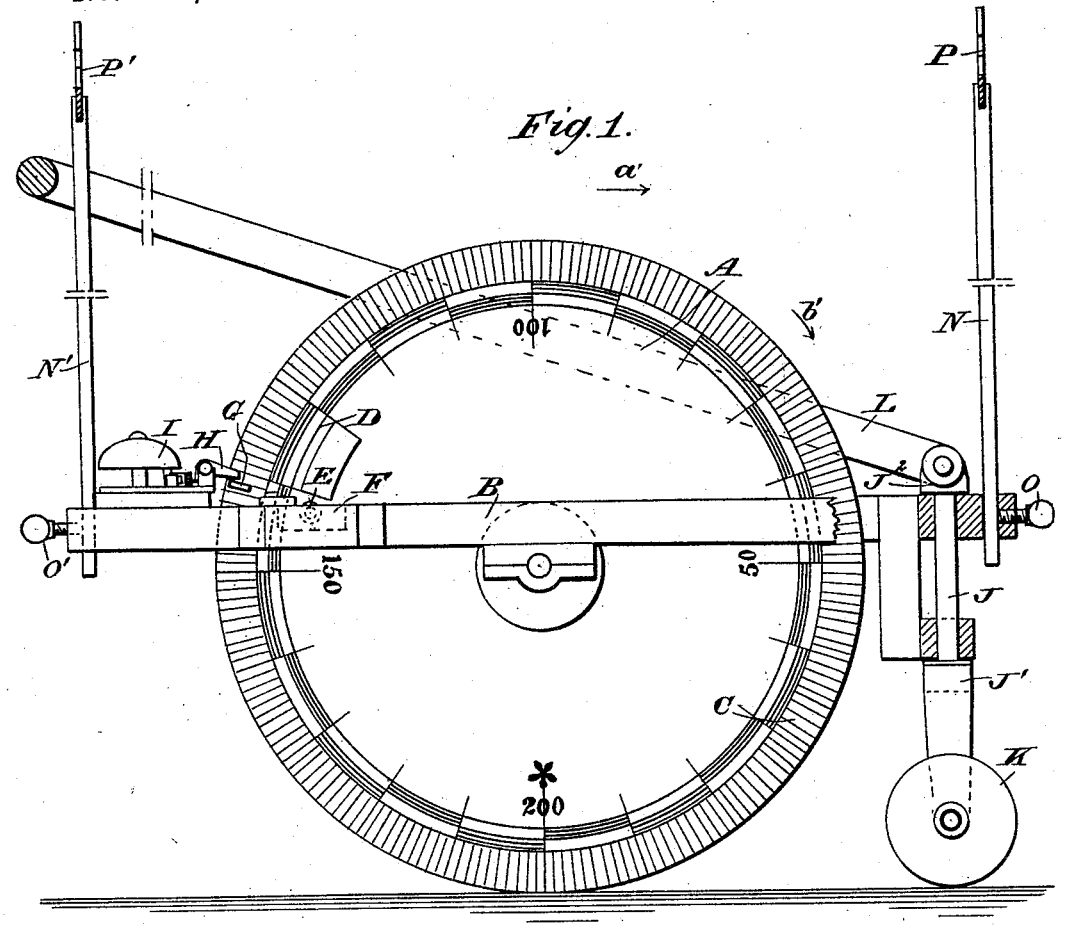
Figure 2:
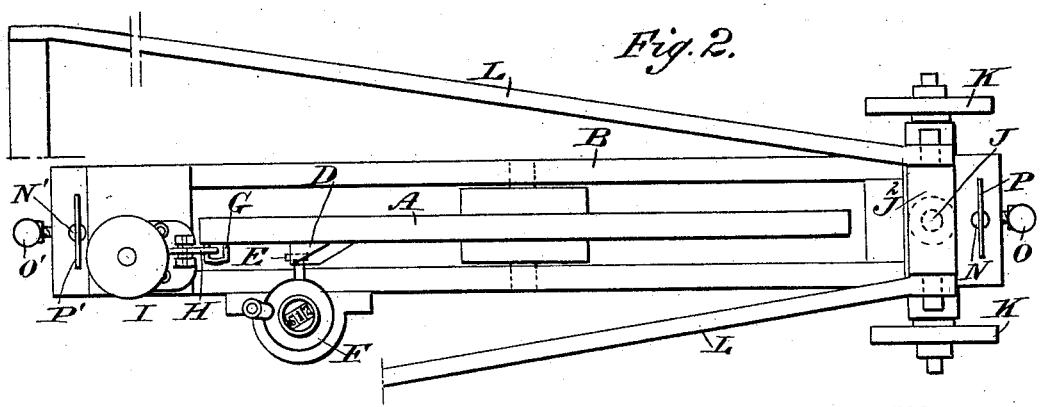
Figure 3:
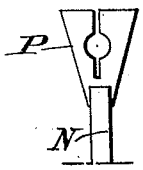

Figure 1 is a side elevation of the improvement, with parts in section. Fig. 2 is a plan view of the same, partly broken away; and Fig. 3 is a face view of one of the sights.

The improved instrument is provided with a wheel A, journaled in a suitably-constructed frame B and provided on one or both faces with a graduation C, indicating linear measurement in meters and subdivisions, or yards and subdivisions, or other like systems of measurement.

As shown in Fig. 1, the graduation C represents two meters and subdivisions or centimeters, indicating that the circumference of the wheel is two meters, so that when the wheel A is moved over the ground and a complete revolution has been made a distance of two meters has been traversed.

On one face of the wheel A is secured a wedge-shaped projection D, adapted to engage on every revolution of the wheel a lever E, which forms part of a registering device F, which may be a register of any approved construction, so that every revolution of the wheel A is registered by the said device. On the face of the wheel A is also fastened a staple or other projection G, adapted to engage on every revolution of the wheel a lever H, adapted to actuate a striker for a bell I, secured on the frame B. The staple G is arranged in line with the edge of the wedge-shaped projection D, so that the registering device F is actuated simultaneously with the sounding of the bell whenever the wheel A completes one revolution. Thus when the wheel A is in the position shown in Fig. 1 and the zero-point of the graduation is on the ground and the frame B is shoved forward in the direction of the arrow $a'$, so that the wheel A rotates in the direction of the arrow $b'$, then the wedge-shaped projection D and the staple G have just cleared the levers E and H, respectively. When the wheel is completing one revolution, coming back to the zero-point, then the wedge-shaped projection D actuates the lever E of the registering device F, so that this revolution of the wheel is registered by the said device. At the same time the staple G actuates the lever H, and the bell I is sounded at about the same time the registering takes place.

In the front of the frame B is journaled a vertically-arranged shaft J, formed at its lower end with a frame J', supporting one or more guiding or steering wheels K, traveling on the ground in front of the wheel A and serving to hold the frame B level. On the upper end of the shaft J is arranged a transversely-extending block $J^2$, which is pivotally connected with the arms L, forming a frame to be taken hold of by the operator pushing the device over the ground to be measured.

The operator manipulating the arms L can turn the shaft J whenever necessary so as to move the guiding or steering wheels K into the proper direction in which the device is to be moved over the ground to be measured. The frame B may also be connected with or form part of a vehicle moved by animal or other power over the ground.

At the front and rear ends of the frame B are arranged to slide vertically in suitable guideways the rods N and N', adapted to be secured in place by set-screws O and O', respectively. The rods N and N' support at their upper ends the sights P and P', respectively, preferably of the construction shown in Fig. 3—that is, being provided with a vertical slot and a circular aperture arranged therein. By the two sights P and P' the operator traveling at the rear end of the machine is enabled to guide the instrument in a straight line to a fixed pole. The wheel A is not liable to expand or contract to any great extent, so that the distance is accurately measured and registered by the wheel.

It will further be seen that with an instrument constructed in this manner very rapid work can be done without dragging cumbersome and heavy chains over the ground.

Having thus described my invention, I claim as new and desire to secure by Letters Patent—

1. In an instrument of the class described, the combination, with a wheel provided on one or both faces with a graduation representing the circumference of the wheel, and projections held on one face of the said wheel, one of the projections being wedge-shaped, of a frame in which the said wheel is journaled, a registering device adapted to be actuated by the said wedge-shaped projection, and a sounding device adapted to be actuated by the other projection, substantially as shown and described.

2. In an instrument of the class described, the combination, with a frame and a measuring-wheel mounted therein, of a steering or guiding wheel journaled in the forward part of the frame, a transverse block on the upper end of the shaft of the wheel, and arms connected with the said block and extending to the rear of the frame, substantially as described.

3. An instrument of the class described, comprising a frame, a measuring-wheel mounted in the frame and provided with projections, a steering-wheel journaled in the forward part of the frame, arms extending from the steering-wheel to the rear part of the frame, a registering device, and a sounding device, said indicating and sounding devices being operated by the projections on the measuring-wheel, substantially as described.

4. An instrument of the class described, comprising a frame, a measuring-wheel mounted in the frame, a steering-wheel journaled in the forward part of the frame, arms extending from the steering-wheel to the rear part of the frame, sights on the rear and forward part of the frame, a registering device, a sounding device, and means for operating said registering and sounding devices from the measuring-wheel, substantially as herein shown and described.

VICTOR ML. ARMENTA.

Witnesses:
MIGUEL E. DIAGO,
ALFREDO GONZÁLEZT.